(12) United States Patent
Gertiser et al.

(10) Patent No.: US 12,542,508 B2
(45) Date of Patent: Feb. 3, 2026

(54) SYSTEMS AND METHODS FOR ACTIVE DISCHARGE FOR INVERTER FOR ELECTRIC VEHICLE

(71) Applicant: BorgWarner US Technologies LLC, Wilmington, DE (US)

(72) Inventors: Kevin M. Gertiser, Carmel, IN (US); David Paul Buehler, Noblesville, IN (US); Vikram Murthy, Carmel, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 176 days.

(21) Appl. No.: 18/596,094

(22) Filed: Mar. 5, 2024

(65) Prior Publication Data

US 2025/0286494 A1 Sep. 11, 2025

(51) Int. Cl.
*H03K 17/16* (2006.01)
*B60L 3/00* (2019.01)
*B60L 15/00* (2006.01)
*H02J 7/00* (2006.01)
*H02P 27/08* (2006.01)
*H02P 29/68* (2016.01)

(52) U.S. Cl.
CPC ............. *H02P 27/08* (2013.01); *B60L 3/003* (2013.01); *B60L 15/007* (2013.01); *H02J 7/0063* (2013.01); *H02P 29/68* (2016.02); *B60L 2210/40* (2013.01); *B60L 2240/525* (2013.01); *B60L 2240/527* (2013.01)

(58) Field of Classification Search
CPC ........ H02P 27/08; H02P 29/68; H02J 7/0063; H02M 1/0045; H02M 1/32; H02M 1/327; H02M 7/5387; H02M 1/322
See application file for complete search history.

(56) References Cited

U.S. PATENT DOCUMENTS

| | | | |
|---|---|---|---|
| 2017/0264284 A1* | 9/2017 | Xu | ........................ H03K 17/166 |
| 2018/0079315 A1 | 3/2018 | Yang et al. | |
| 2022/0263404 A1 | 8/2022 | Volke et al. | |
| 2023/0170790 A1 | 6/2023 | Kandah et al. | |

\* cited by examiner

*Primary Examiner* — Muhammad S Islam
(74) *Attorney, Agent, or Firm* — Bookoff McAndrews, PLLC

(57) ABSTRACT

A system includes: an inverter configured to convert DC power from a battery to AC power to drive a motor, wherein the inverter includes: one or more switches; and one or more controllers configured to: determine a gate voltage to operate the one or more switches of the inverter based on a temperature of the inverter; operate the one or more switches based on a pulse width modulated (PWM) signal and the gate voltage to initiate an active discharge of a bus voltage of the inverter; and while the bus voltage is greater than a first threshold voltage, accelerate the active discharge of the bus voltage by operating the one or more switches and by performing one or more of increasing the gate voltage or decreasing a wait time following a pulse of the PWM signal.

20 Claims, 11 Drawing Sheets

SYSTEMS AND METHODS FOR ACTIVE DISCHARGE FOR INVERTER FOR ELECTRIC VEHICLE

TECHNICAL FIELD

Various embodiments of the present disclosure relate generally to systems and methods for controlling an active discharge of an inverter for an electric vehicle, and, more particularly, to systems and methods of accelerating an active discharge of an inverter for an electric vehicle.

BACKGROUND

Inverters, such as those used to drive a motor in an electric vehicle, for example, are responsible for converting High Voltage Direct Current (HVDC) into Alternating Current (AC) to drive the motor. In an inverter, a bulk capacitor is discharged in the event of a fault condition to reduce the risk of contact with high voltages. Active discharge of the bulk capacitor may stress power switches.

The present disclosure is directed to overcoming one or more of these above-referenced challenges.

SUMMARY OF THE DISCLOSURE

In some aspects, the techniques described herein relate to a system including: an inverter configured to convert DC power from a battery to AC power to drive a motor, wherein the inverter includes: one or more switches; and one or more controllers configured to: determine a gate voltage to operate the one or more switches of the inverter based on a temperature of the inverter; operate the one or more switches based on a pulse width modulated (PWM) signal and the gate voltage to initiate an active discharge of a bus voltage of the inverter; and while the bus voltage is greater than a first threshold voltage, accelerate the active discharge of the bus voltage by operating the one or more switches and by performing one or more of increasing the gate voltage or decreasing a wait time following a pulse of the PWM signal.

In some aspects, the techniques described herein relate to a system, wherein the one or more controllers are further configured to: determine a voltage reduction of the bus voltage based on the operation of the one or more switches; and in response to determining the voltage reduction of the bus voltage is less than a second threshold voltage, performing one or more of increasing the gate voltage or determining whether a contactor of the inverter has faulted.

In some aspects, the techniques described herein relate to a system, wherein performing one or more of increasing the gate voltage or determining whether the contactor of the inverter has faulted includes: incrementing a fault count; when the fault count is less than a fault threshold, increasing the gate voltage; and when the fault count is greater than or equal to the fault threshold, determining whether the contactor of the inverter has faulted.

In some aspects, the techniques described herein relate to a system, wherein determining the gate voltage further includes: determining the temperature of the inverter; determining a threshold voltage for the one or more switches; and determining the gate voltage based on the threshold voltage for the one or more switches, wherein the gate voltage is less than the threshold voltage for the one or more switches.

In some aspects, the techniques described herein relate to a system, wherein performing one or more of increasing the gate voltage or decreasing the wait time following the pulse of the PWM signal further includes: initiating a timer; when the timer is greater than a threshold time, increasing the gate voltage and resetting the timer; and while the timer is less than the threshold time: operating the one or more switches based on a first PWM signal; determining the bus voltage; and setting the wait time following the first PWM signal based on the bus voltage.

In some aspects, the techniques described herein relate to a system, wherein performing one or more of increasing the gate voltage or decreasing the wait time following the pulse of the PWM signal further includes: while the timer is less than the threshold time: operating the one or more switches based on the first PWM signal; determining whether a PWM cycle count of the first PWM signal is greater than a threshold cycle count; and when the PWM cycle count is greater than the threshold cycle count, resetting the PWM cycle count, opening the one or more switches, and determining the first threshold voltage.

In some aspects, the techniques described herein relate to a system, wherein setting the wait time following the first PWM signal based on the bus voltage includes: when the bus voltage is in a first voltage range, setting the wait time to a first value, delaying the operation of the one or more switches for the first value of the wait time, and determining whether the timer is less than the threshold time, and when the bus voltage is in a second voltage range less than the first voltage range, setting the wait time to a second value less than the first value, delaying operation of the one or more switches for the second value of the wait time, and determining whether the timer is less than the threshold time, wherein a lower value of the second voltage range is equal to the first threshold voltage.

In some aspects, the techniques described herein relate to a system, further including: the battery configured to supply the DC power to the inverter; and the motor configured to receive the AC power from the inverter to drive the motor, wherein the system is provided as a vehicle including the inverter, the battery, and the motor.

In some aspects, the techniques described herein relate to a system including one or more controllers configured to: determine a gate voltage to operate one or more switches of an inverter based on a temperature of the inverter; operate the one or more switches based on a pulse width modulated (PWM) signal and the gate voltage to initiate an active discharge of a bus voltage of the inverter; and while the bus voltage is greater than a first threshold voltage, accelerate the active discharge of the bus voltage by operating the one or more switches and by performing one or more of increasing the gate voltage or decreasing a wait time following a pulse of the PWM signal.

In some aspects, the techniques described herein relate to a system, wherein performing one or more of increasing the gate voltage or decreasing the wait time following the pulse of the PWM signal further includes: initiating a timer; when the timer is greater than a threshold time, increasing the gate voltage and resetting the timer; and while the timer is less than the threshold time: operating the one or more switches based on a first PWM signal; determining the bus voltage; and setting the wait time following the first PWM signal based on the bus voltage.

In some aspects, the techniques described herein relate to a system, wherein setting the wait time following the first PWM signal based on the bus voltage includes: when the bus voltage is in a first voltage range, setting the wait time to a first value, delaying the operation of the one or more switches for the first value of the wait time, and determining whether the timer is less than the threshold time, and when the bus voltage is in a second voltage range less than the first voltage range, setting the wait time to a second value less than the first value, delaying operation of the one or more switches for the second value of the wait time, and determining whether the timer is less than the threshold time.

In some aspects, the techniques described herein relate to a method including: performing, by one or more controllers, operations for controlling an inverter, the operations including: receiving a request to initialize an active discharge of a bus voltage of the inverter; determining a gate voltage to operate one or more switches of the inverter based on a temperature of the inverter; operating the one or more switches based on a pulse width modulated (PWM) signal and the gate voltage to initiate the active discharge of the bus voltage; and while the bus voltage is greater than a first threshold voltage, accelerating the active discharge of the bus voltage by operating the one or more switches and by performing one or more of increasing the gate voltage or decreasing a wait time following a pulse of the PWM signal.

In some aspects, the techniques described herein relate to a method, the operations further including: operating the one or more switches; determining a voltage reduction of the bus voltage; and in response to determining the voltage reduction of the bus voltage is less than a second threshold voltage, performing one or more of increasing the gate voltage or determining whether a contactor of the inverter has faulted.

In some aspects, the techniques described herein relate to a method, wherein performing one or more of increasing the gate voltage or determining whether the contactor of the inverter has faulted includes: incrementing a fault count; when the fault count is less than a fault threshold, increasing the gate voltage; and when the fault count is greater than or equal to the fault threshold, determining whether the contactor of the inverter has faulted.

In some aspects, the techniques described herein relate to a method, wherein determining the gate voltage further includes: determining the temperature of the inverter; determining a threshold voltage for the one or more switches; and determining the gate voltage based on the threshold voltage for the one or more switches, wherein the gate voltage is less than the threshold voltage for the one or more switches.

In some aspects, the techniques described herein relate to a method, wherein performing one or more of increasing the gate voltage or decreasing the wait time following the pulse of the PWM signal further includes: initiating a timer; and when the timer is greater than a threshold time, increasing the gate voltage and resetting the timer.

In some aspects, the techniques described herein relate to a method, wherein performing one or more of increasing the gate voltage or decreasing the wait time following the pulse of the PWM signal further includes: while the timer is less than the threshold time: operating the one or more switches based on a first PWM signal; determining the bus voltage; and setting the wait time following the first PWM signal based on the bus voltage.

In some aspects, the techniques described herein relate to a method, wherein performing one or more of increasing the gate voltage or decreasing the wait time following the pulse of the PWM signal further includes: while the timer is less than the threshold time: operating the one or more switches based on the first PWM signal; determining whether a PWM cycle count of the first PWM signal is greater than a threshold cycle count; and when the PWM cycle count is greater than the threshold cycle count, resetting the PWM cycle count, opening the one or more switches, and determining the first threshold voltage.

In some aspects, the techniques described herein relate to a method, wherein setting the wait time following the first PWM signal based on the bus voltage includes: when the bus voltage is in a first voltage range, setting the wait time to a first value, delaying the operation of the one or more switches for the first value of the wait time, and determining whether the timer is less than the threshold time, and when the bus voltage is in a second voltage range less than the first voltage range, setting the wait time to a second value less than the first value, delaying operation of the one or more switches for the second value of the wait time, and determining whether the timer is less than the threshold time.

In some aspects, the techniques described herein relate to a method, wherein a lower value of the second voltage range is equal to the first threshold voltage.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
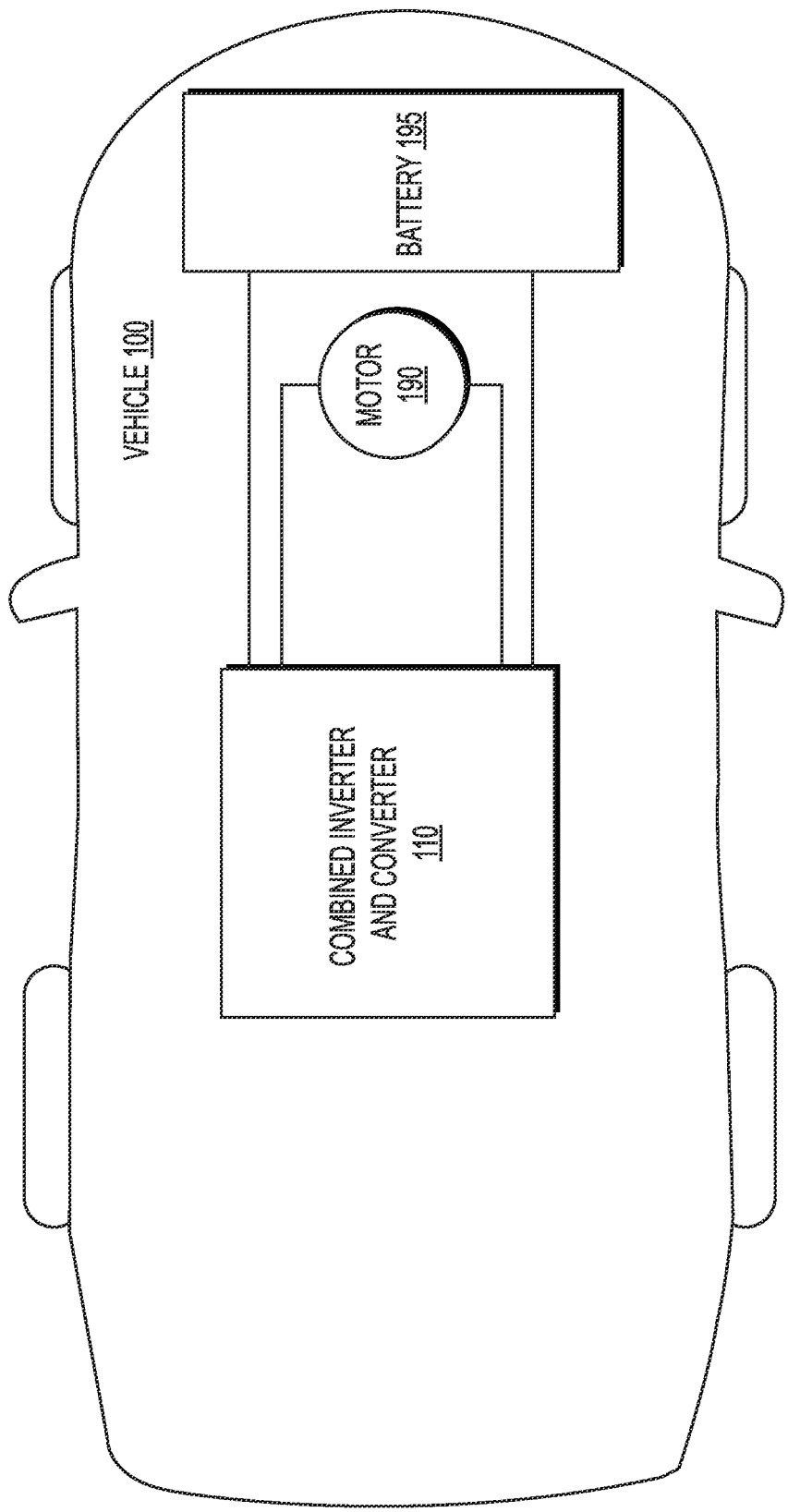
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems and methods for controlling an active discharge of an inverter for an electric vehicle, and, more particularly, to systems and methods of accelerating an active discharge of an inverter for an electric vehicle.

Inverters, such as those used to drive a motor in an electric vehicle, for example, are responsible for converting High Voltage Direct Current (HVDC) into Alternating Current (AC) to drive the motor. A three phase inverter may include a bridge with six power device switches (for example, power transistors such as IGBT or MOSFET) that are controlled by Pulse Width Modulation (PWM) signals generated by a controller. An inverter may include three half-H bridge switches to control the phase voltage, upper and lower gate drivers to control the switches, a PWM controller, and glue logic between the PWM controller and the gate drivers. The PWM controller may generate signals to define the intended states of the system. The gate drivers may send the signals from the PWM controller to the half-H bridge switches. The half-H bridge switches may drive the phase voltage. Six phase (or other phase) inverters and multi-level inverters are not excluded from this concept and will follow similar principles.

As a result of system design, a significant amount of energy may be stored on the high voltage bus bulk/DC link capacitor of the inverter. This stored high voltage energy must be dissipated to prevent human exposure to dangerous voltage levels. A function of inverters called "active discharge" allows for the controlled dissipation of the stored energy in the system capacitance. The system capacitance is generally referred to as a bulk capacitor in inverter systems. A high voltage battery providing energy to the inverter is disconnected prior to initiating active discharge of the bus to avoid discharging the battery. The active discharge function has the ability to quickly dissipate high voltage bus energy for safety in events such as vehicle service, vehicle crash, and the like. The rate of discharge is a function of initial bus voltage, capacitance, and the energy dissipation mechanism. Government/OEM regulations also dictate what discharge rates are required. For example, regulations may require that a high voltage bus must be discharged below 60V in less than 2.5 seconds.

Inverters frequently have a safety requirement to discharge the bulk capacitor on the inverter, in the event of a crash or other fault situation, in a short period of time, such as between 1 and 3 seconds, for example. Some systems discharge the bulk capacitor using the motor windings, which requires the motor to not be shorted and for the main microcontroller to be available. Some systems discharge the bulk capacitor using a dedicated resistive discharge, which is frequently a combination of high power resistors, a switch, and a controller.

Accordingly, an inverter may use switching losses in the inverter power device switches (IGBT/FET) to discharge energy. Controlling the power devices on/off (also referred to as enabling/disabling) creates losses that can be predicted. Switching numerous times at a high frequency rate will contribute to a significant amount of these accumulated losses. A rate of the discharge (losses) may be proportional to the switching frequency. These losses can be used to discharge the HVDC bus quickly, as a backup or without the added cost and complexity of using the motor windings or a dedicated resistive discharge. Additionally, by eliminating the resistive element from some approaches, substantial cost, circuit board area, and unwanted heat can be saved.

Inverters, such as those used to drive a motor in an electric vehicle, for example, are responsible for converting High Voltage Direct Current (HVDC) into Alternating Current (AC) to drive the motor. In an inverter, a bulk capacitor is discharged in the event of a fault condition to reduce the risk of contact with high voltages. Active discharge of the bulk capacitor may stress power switches. Stressing power switches may occur during active discharge where the SiC semiconductor is biased with a lower gate voltage and the device is operating in an ohmic region, thus operating as a resistor.

Some systems discharge the bulk capacitor using gate drivers to operate one power switch in the half-H bridge switches in a linear mode, which effectively uses the power switch as a resistor by controlling the gate positive bias voltage and/or switching. In this method, one power switch (e.g. upper switch) is turned ON as in a normal operation, and the other power switch (e.g. lower switch) is pulsed ON with a reduced gate voltage. The HVDC bus and bulk capacitor may be discharged via specific PWM pulses. The drain current of a power switch may increase by a factor of eight or more with a temperature variation. This temperature variation may be due to self-heating of the power switch when in a linear mode, or an initial temperature of the power switch at the initialization of active discharge, for example. During active discharge, the power switch may experience an increase in temperature that is significant enough to produce failure if the temperature is not controlled.

A power switch may have a significant difference in a transfer characteristic based on temperature, especially in a linear mode region targeted by the DC-Link discharge. Temperature differences may be based on environmental temperatures, and may include temperatures such as −40 C to 100° C. operating temperatures, for example.

Some systems discharge the bulk capacitor using threshold detection, which requires an opposite device to be off, may have an option to increase a sensed threshold by one step (e.g. 390 mV), and may have a voltage that is fixed at a start of the discharge operation and not variable during the discharge operation. Some systems discharge the bulk capacitor using a pre-programmed voltage, where the voltage is fixed at power-up during a configuration mode, and cannot be changed during an operation of the inverter.

As an example, a specification might stipulate 4 A per die. At a die temperature of 100 C, a gate voltage may be 3.08V for a die current of 4 A. At a temperature of 25 C and a gate voltage of 3.08V, the die current may be 0.8 A (approximately 20% rating). At a temperature of 125 C and a gate voltage of 3.08 V, the die current may be 5.3 A (approximately 133% rating). At a temperature of 140 C and a gate voltage of 3.08V, the die current may be 5.8 A (approximately 145% rating). At a temperature of 175 C and a gate voltage of 3.08V, the die current may be 12.13 A (approximately 300% rating). Additional errors will occur as the drain voltage changes. For example, when the drain to source voltage is 950V, SiC FET transconductance is much higher, resulting in significantly higher drain to source current. This must be considered during the process of estimating the required gate voltage.

Some systems used to perform discharge of a DC Link capacitor use large, high power resistors which are activated via an FET to resistively discharge the DC Link capacitor. Some systems perform discharge by using gate driver ICs in combination with the inverter power switches which are normally used to drive the electric machine. Some gate drivers implement hard switching of power devices connected across the capacitive load. The upper and lower devices are turned on such that current is effectively shorted from HV+ to HV− for a short period of time to discharge the DC Link capacitor (i.e. shoot through current mode of active discharge). Some gate drivers turn the power semiconductor on in a resistive linear mode by setting the VGS voltage to a defined value, to discharge at a sufficiently low value of current so as to not destroy or overheat the power switch which is operated in a linear mode (i.e. controlled shoot through current mode of active discharge). In addition, the current may change as the power semiconductor heats up, with positive feedback not considered to discharge at the intended low current.

However, some methodologies may not perform active discharge while the vehicle is in motion and/or the wheels are spinning, as this results in generation of EMF during the discharge event and eliminates the possibility to accurately sense Vgs threshold voltages. The value of capacitance to be discharged may be unknown as multiple (e.g. one to three) modules may need to be discharged and coordination may not be possible. The discharge may need to accommodate higher system voltages than anticipated by the gate drivers, and the energy stored in the capacitor increases with the square of voltage ($E=1/2*C*V^2$). Protection mechanisms (e.g. temperature sense) assumed to be usable by the gate drivers may not be usable for fast, high power discharge pulses. Timely discharge of the DC Link capacitor may require periodic adjustment of the discharge profile, such that discharge can be achieved in the allowable time frame dictated by safety standards, as interpreted by vehicle manufacturers. Typical protection mechanisms such as current sense may not be available. Some methodologies of active discharge may not account for current sharing among devices in a die, when operated in the linear mode. Some methodologies may not account for required VGS threshold estimation errors, which may quickly result in power switch damage.

One or more embodiments may overcome the issues of some methodologies of active discharge as described above. For example, one or more embodiments may address one or more of: insufficient resolution on the Vgs setting to control shoot through current to safe levels; insufficient pulse width control; insufficient discharge period control; insufficient resolution of the Vgs measurement; an inability to predict resultant current at high Vds voltages; an inability to detect which inverter is performing the active discharge, and which bulk capacitor is being discharged; an inability to predict the value of capacitance being discharged; or an inability to predict SiC FET transconductance, and the effects thereof.

One or more embodiments may provide an algorithm that systematically estimates power switch bias voltage, programmatically increments a gate voltage, and ensures safe operating compliance in active short circuit mode of active discharge with an optimized bulk capacitor discharge time. One or more embodiments may utilize a gate driver operated in a mode where the current is limited, resulting in a large voltage drop across the device during the discharge event. One or more embodiments may precisely control the power dissipation resulting from this discharge event, thereby limiting the temperature rise in the power device (e.g. IGBT/SiC power switches) and maintaining the temperature in the specified safe operating area. One or more embodiments may control the turn on and turn off time to allow the power device to cool down between pulses and limiting the temperature rise during each cycle such that the maximum junction temperature of the power semiconductor is not exceeded. One or more embodiments may provide an upper level algorithm controlling the PWM profiles and managing temperature rise in the power devices during the active discharge event, completing the capacitor discharge in a safe, timely, and reliable manner.

One or more embodiments may use a dynamic algorithm contingent on HVDC bus voltage, SiC threshold voltage estimation, and the desired discharge time. One or more embodiments may accelerate an active discharge time as a function of HVDC bus voltage, by using a constant on-time variable frequency methodology. One or more embodiments may provide an algorithm that incorporates changes to the bias of the gate voltage as a function of the initial threshold value and temperature changes. One or more embodiments may provide an algorithm that uses anticipated differences in current sharing between dies by using bias voltage and cooling times, which may leverage the thermal capacitance of the cooling system. One or more embodiments may provide a retry strategy to fulfill customer requirements despite the open loop operating restriction, and may determine a condition of the battery contactor. One or more embodiments may provide an algorithm that is designed to operate within a defined safe operating area of the power switch.

One or more embodiments may be optimized for a high capacitance, high voltage, and subsequent high energy system where open loop methodology is required. One or more embodiments may allow wheels of the vehicle to rotate during the discharge event. One or more embodiments may provide an algorithm that does not monitor the power switch current during the discharge event.

The algorithm may generate a look up table that characterizes the expected power switch package temperature and gate threshold voltage of the power switch. The algorithm may update the look up table whenever the inverter is placed in a six switch open operation with no current flowing due to back EMF in the system. The algorithm may receive a request to initiate the active discharge, and may determine the temperature and compare the determined temperature to the previous temperature to adjust the gate voltage threshold. The algorithm may use the following equation to determine the new threshold voltage: $V_{TH}(T)=V_{TH0}-k_{VT}(T-T0)$.

1V, for example, of system error may be caused by one or more of measurement error of threshold detection in the gate driver, low current threshold detection versus conduction current, or threshold variation as a function of temperature. The initial temperature used should correlate to the coolant temperature, as the thermal time constant will allow for the starting temperature relative to coolant temperature. Based on the calculated ideal threshold voltage and the subtracted error, the algorithm may determine the nearest gate voltage setting provided by the gate driver, and round down to a nearest value in the look up table.

One or more embodiments may apply short duration pulses in the discharge circuit to limit temperature rise. For example, the pulse may be restricted to 6.4 μs of on time for a 600 μs period. The algorithm may generate a pulse train enabled for 3 ms, for example, with a variable off time for cool down. The on-time sequence will be referred to as applied pulse. After the initial pulse, the algorithm may generate a 174 ms, for example, cool down time where the switch is biased off. The algorithm may then increment the gate voltage one set point step. The algorithm may cycle this operation twice more for a total of 3 pulses, for example, and may clamp the maximum allowable gate voltage. If a voltage decay of 20V, for example, or more is not detected, then the algorithm may repeat the pulse for a total of 3 times, for example, with an off time of 174 ms, for example, between pulses for discharge events. If a voltage decay of 20V, for example, is not detected, the algorithm may determine that a contactor to disconnect the battery is faulted in a closed position.

If a 20V, for example, decay is detected, then the algorithm may apply another pulse and increment the gate voltage setting every 150 ms, for example. The algorithm may measure the HVDC at the time of the pulse, and set a different off time. This process may continue until the voltage discharge is complete (e.g., until the HVDC reaches 60V). If the cycle count reaches 67 cycles, for example, (which may correlate with 10 seconds) and the discharge is not complete, the algorithm may read the threshold, initiate a gate voltage threshold read, and begin another discharge cycle.

One or more embodiments may accommodate limitations such as spinning wheels or an open loop algorithm. One or more embodiments may utilize an algorithm to consider alternative systems conditions. For example, one or more embodiments may interpolate and adjust threshold changes based on associated temperature rise.

System limitations may prevent measurement of gate thresholds just prior to the discharge event, and the system may either be in run mode or active short circuit mode. One or more embodiments may model and track thresholds in software, and the algorithm may account for temperature changes. One or more embodiments may estimate threshold voltage to remain below the expected gate threshold voltage. One or more embodiments may estimate threshold voltage above the expected gate threshold voltage. One or more embodiments may utilize longer pulse widths to compensate for increasing the cooldown time dynamically based on the state of the system voltage. One or more embodiments may accelerate discharge as a function of a reduction of the HVDC bus voltage.

One or more embodiments may utilize an open loop algorithm, with wheels spinning (Inverter in generating mode) with no knowledge of switch current in the loop. One or more embodiments may accelerate discharge as a function of HVDC voltage. One or more embodiments may incorporate bias voltage adjustments as a function of initial value and temperature. One or more embodiments may incorporate a retry strategy compliant with the open loop constraints. One or more embodiments may incorporate bias adjustment time and values to ensure Safe Operating Area compliance of an individual die within a power switch. One or more embodiments may apply multiple phases in parallel for accelerated discharge.

One or more embodiments may programmatically adjust applied bias voltages, duty cycles, and intermittent discharge pulse sequence durations. One or more embodiments may operate in the active short circuit mode. One or more embodiments may decrease a period between discharge pulses based on a reduction of the HVDC bus voltage to decrease the discharge time. One or more embodiments may manage temperature rise within a power semiconductor for a given discharge requirement (C, V, t). As HVDC decreases, one or more embodiments may incrementally increase the gate voltage to increase the discharge rate. One or more embodiments may programmatically apply an intermittent discharge sequence rather than a continuous pulse train. One or more embodiments may operate without testing threshold voltage at time of discharge. One or more embodiments may use a threshold voltage estimation and offset function to safely initiate a discharge event. One or more embodiments may monitor HVDC and adjust cooling time between discharge sequences.

One or more embodiments may be optimized for high voltage, high capacitance, SiC based systems. One or more embodiments may discharge 3 mF of bus capacitance at 950V in less than 2.5 seconds. One or more embodiments may provide safe discharge with no knowledge of switch current (SiC die). One or more embodiments may provide non-simultaneous start of discharge with multiple controllers. One or more embodiments may accommodate operation of an inverter in a generating mode (e.g., wheels spinning, etc.). One or more embodiments may accommodates die-to-die threshold variation within a switch. One or more embodiments may ensure a safe operating area of each individual die within a power switch. One or more embodiments may ensure survival of an SiC die in the event of a stuck contactor. One or more embodiments may be applied to multiple phases in parallel for accelerated discharge. One or more embodiments may utilize upper or lower switches in a linear mode with appropriate active short circuit modes.

One or more embodiments may execute with an inverter in generating mode or with a closed opposite switch in presence of high voltage. One or more embodiments may provide an algorithm that starts with a gate voltage which will not result in conduction, incrementally increasing the gate voltage programmatically, while monitoring HVDC voltage. One or more embodiments may incorporate bias voltage adjustments as a function of initial value and temperature. One or more embodiments may execute an active discharge with no knowledge of current in the switch. One or more embodiments may apply pulses for durations which are shorter than the thermal time constant of the system (i.e. intermittently). One or more embodiments may modify an off time to remain in a safe operating area as a function of HVDC voltage for fast discharge. One or more embodiments may incorporate a retry strategy compliant with the open loop constraints. One or more embodiments may be applied to multiple phases in parallel for accelerated discharge.

FIG. 1 depicts an exemplary system infrastructure for a vehicle including a combined inverter and converter, according to one or more embodiments. Alternatively, the inverter may be an inverter without a converter. In the context of this disclosure, the inverter without a converter, or the combined inverter and converter, may be referred to as an inverter. As shown in FIG. 1, electric vehicle 100 may include an inverter 110, a motor 190, and a battery 195. The inverter 110 may include components to receive electrical power from an external source and output electrical power to charge the battery 195 of electric vehicle 100. The inverter 110 may convert DC power from the battery 195 in electric vehicle 100 to AC power, to drive (e.g. rotate) the motor 190 of the electric vehicle 100, for example, but the embodiments are not limited thereto. The inverter 110 may be bidirectional, and may convert DC power to AC power, or convert AC power to DC power, such as during regenerative braking, for example. The inverter 110 may be a three-phase inverter, a single-phase inverter, or a multi-phase inverter.

Figure 2:
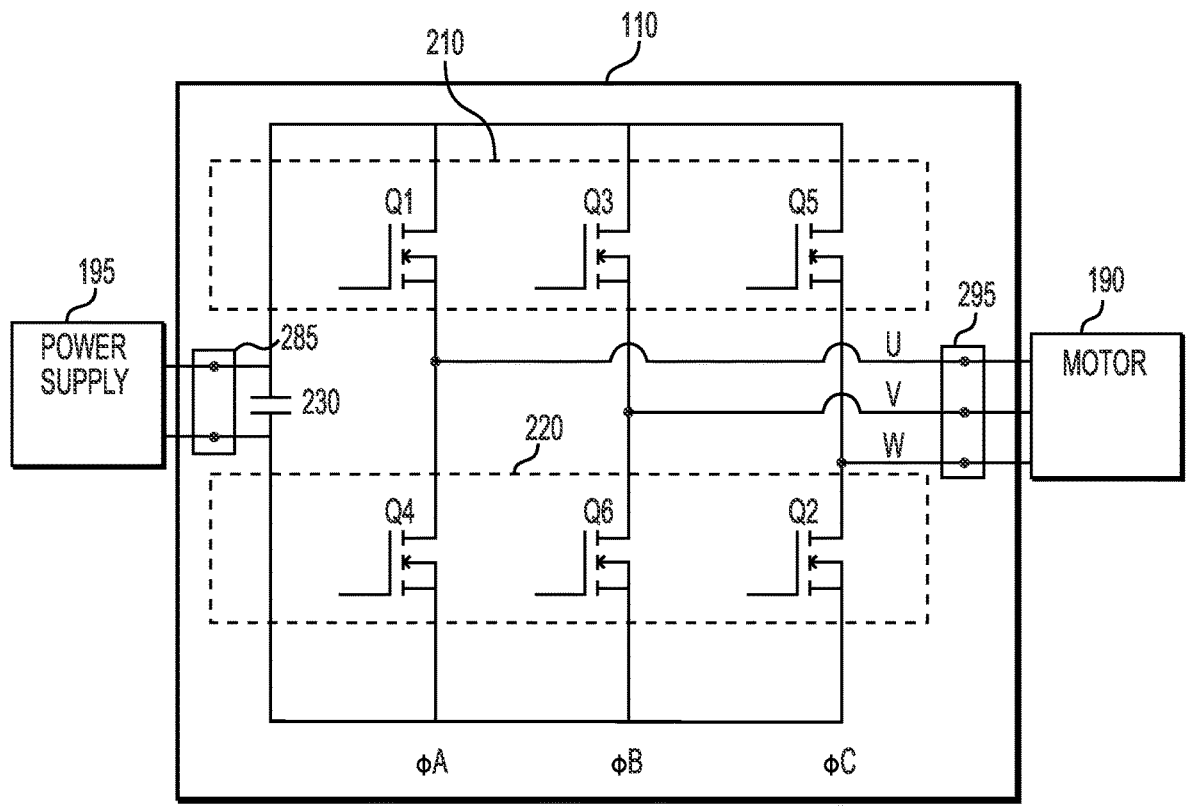
FIG. 2 depicts an electrical power schematic of a three phase inverter module in a connected system, according to one or more embodiments.

FIG. 2 depicts an electrical power schematic of a three phase inverter module, according to one or more embodiments. As shown in FIGS. 1 and 2, the inverter 110 may be connected to the battery, or power supply, 195 and the motor, or load, 190. The inverter 110 may include first three-phase switch group 210, and second three-phase switch group 220. A first phase U may correlate with ΦA including switches Q1 and Q4, a second phase V may correlate with ΦB including switches Q3 and Q6, and a third phase W may correlate with ΦC including switches Q5 and Q2, as illustrated in FIG. 2. The first three-phase switch group 210 may include first phase switch Q1, second phase switch Q3, and third phase switch Q5. The second three-phase switch group 220 may include first phase switch Q4, second phase switch Q6, and third phase switch Q2. The switches Q1-Q6 may be metal-oxide-semiconductor field-effect transistors (MOSFET), for example, but are not limited thereto.

The first three-phase switch group 210 and second three-phase switch group 220 may be driven by a PWM signal generated by inverter controller 300 (shown in FIG. 3) to convert DC power delivered via input terminal set 285 at capacitor 230 to three phase AC power at outputs U, V, and W via output terminal set 295 to the motor 190. Additionally, although FIGS. 1 and 2 illustrate a three-phase inverter, the disclosure is not limited thereto, and may include single phase or multi-phase inverters.

Figure 3:
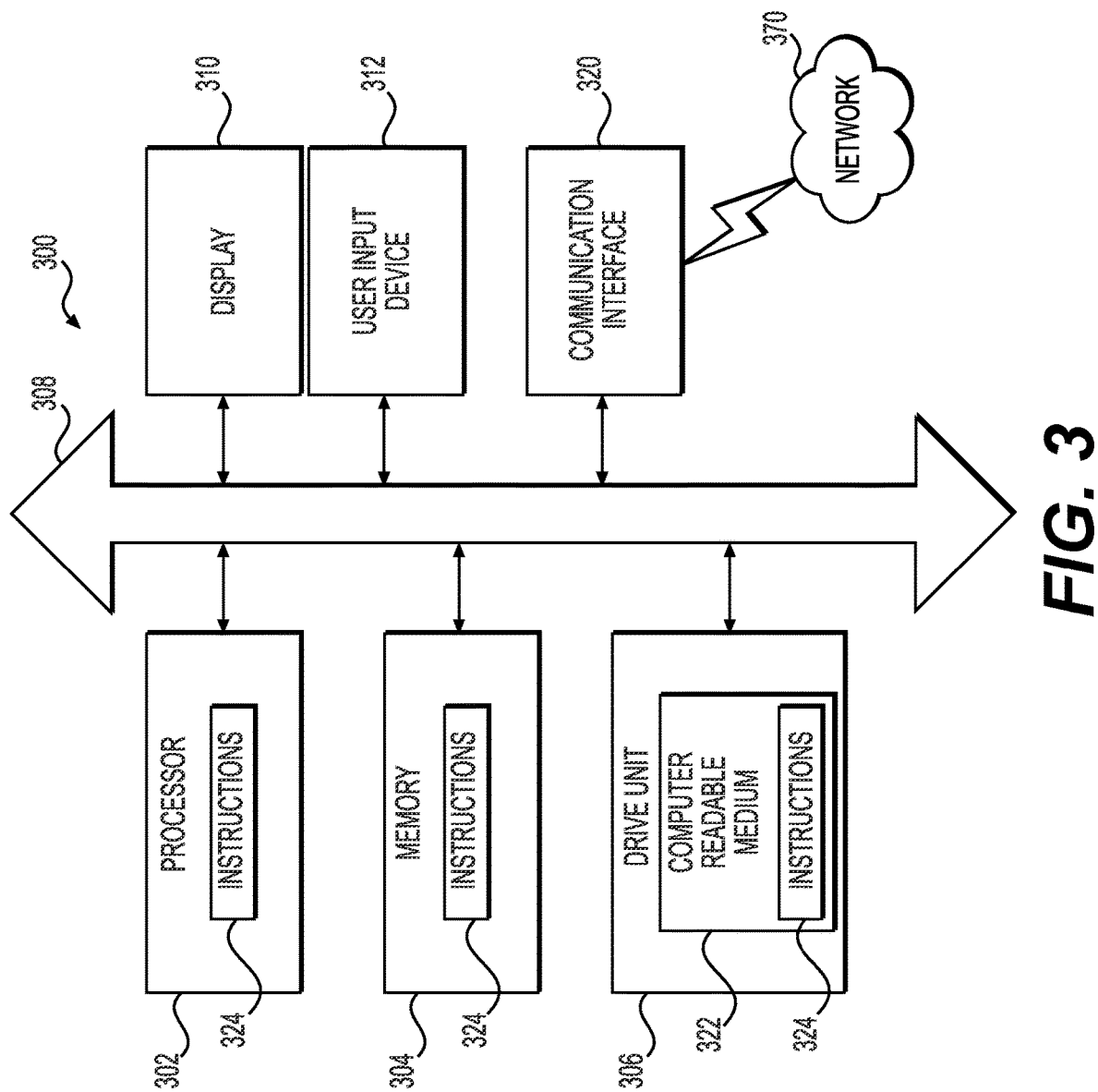
FIG. 3 depicts an implementation of a computer system that may execute techniques presented herein, according to one or more embodiments.

FIG. 3 depicts an exemplary system infrastructure for the inverter controller 300 of FIG. 2, according to one or more embodiments. The inverter controller 300 may include one or more controllers.

The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As shown in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of the inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, the computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component or object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It will be understood that any operation (e.g., such as those disclosed in reference to FIGS. 4-10) disclosed herein are not limited to be performed any specific order or sequence. Any order or sequence disclosed herein is only disclosed as an example, and one or more of the operations (e.g., of a given process) may be performed in any applicable manner, as understood by one skilled in the art.

Figure 4:
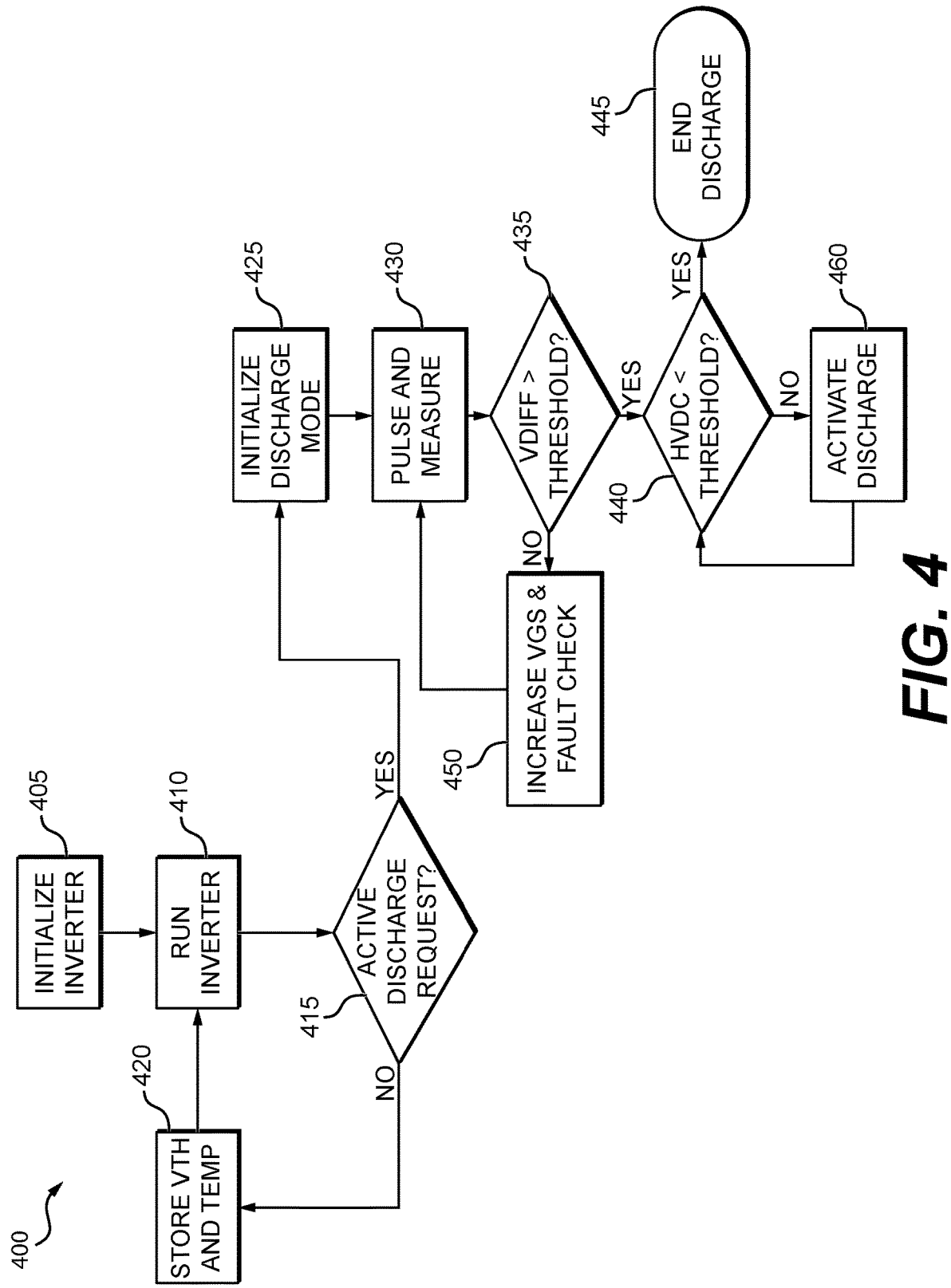
FIG. 4 depicts an exemplary method for operating an inverter to perform an active discharge, according to one or more embodiments.

FIG. 4 depicts an exemplary method 400 for operating inverter 110 to perform an active discharge, according to one or more embodiments. FIG. 4 depicts an overview of exemplary method 400, including the operation of inverter 110 in a normal running operation and an active discharge operation, and FIGS. 5-10 further depict various operations depicted in FIG. 4.

Figure 5:
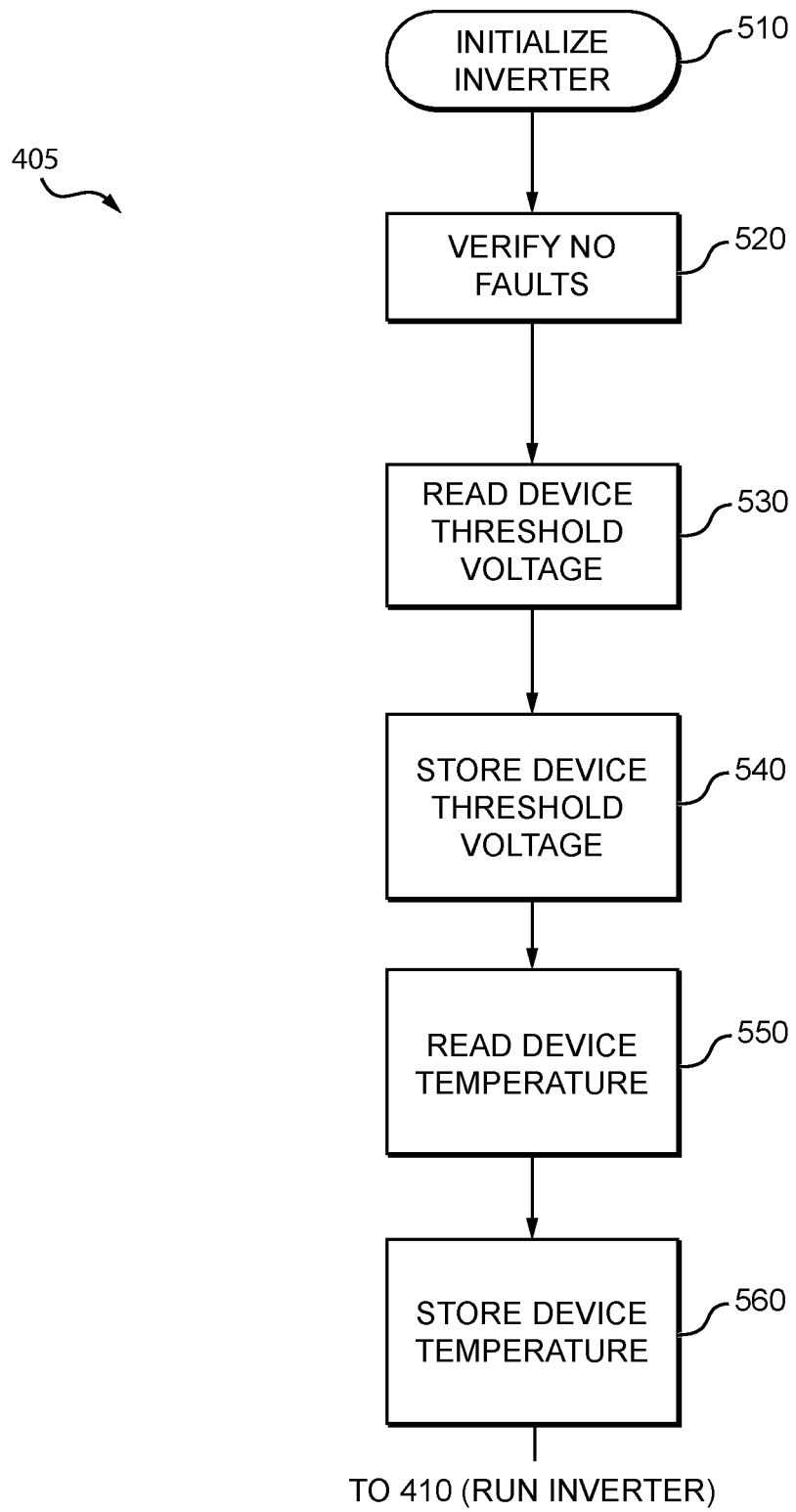
FIG. 5 depicts an exemplary method for initializing an inverter, according to one or more embodiments.

Exemplary method 400 may include initializing inverter 110 (operation 405, see also FIG. 5). Exemplary method 400 may include running inverter in a mission mode (operation 410), which may be a normal operating mode to convert DC power from the battery 195 in electric vehicle 100 to AC power, to drive (e.g. rotate) the motor 190 of the electric vehicle 100. Exemplary method 400 may include determining whether a request for active discharge is active (operation 415). For example, inverter controller 300 may receive a command to perform an active discharge operation, or may determine that a condition is satisfied to perform an active discharge operation. Exemplary method 400 may include, in response to determining that a request for active discharge (no in operation 415) is not active, storing a threshold voltage and temperature of the inverter 110 (operation 420, see also FIG. 6). Exemplary method 400 may include, in response to determining that a request for active discharge is active (yes in operation 415), initializing an active discharge mode and measuring a first voltage (operation 425, see also FIG. 7).

Figure 8:
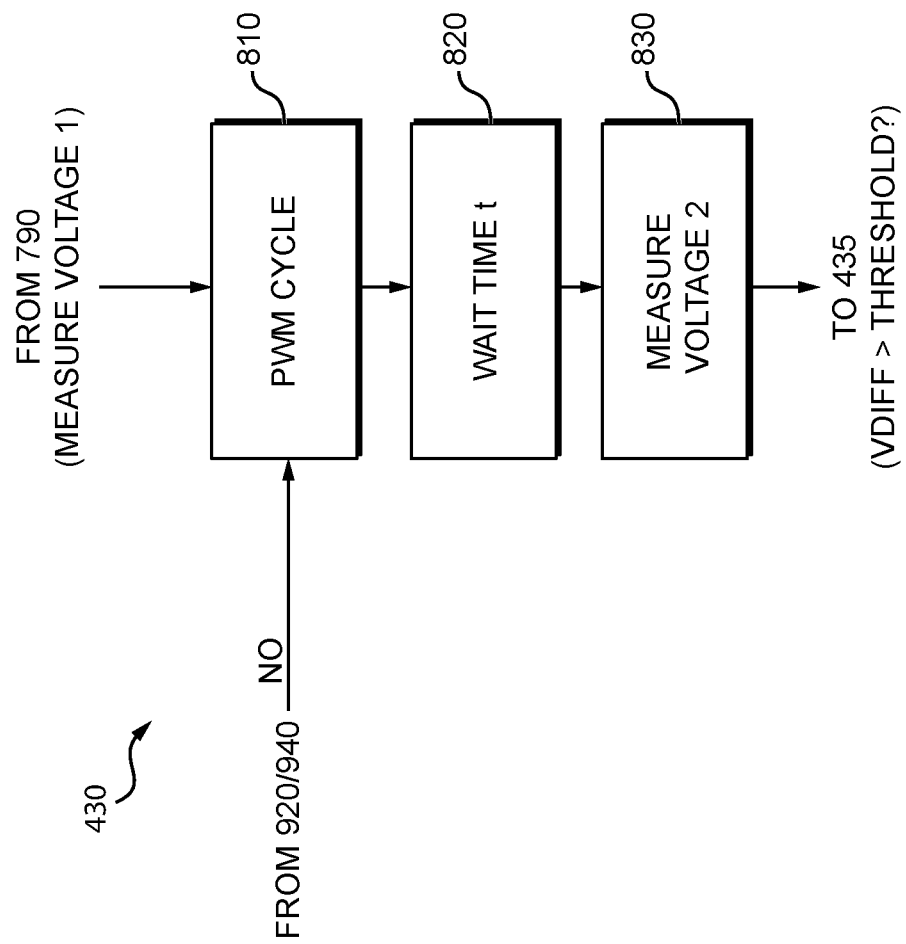
FIG. 8 depicts an exemplary method for initiating a pulse and measure function, according to one or more embodiments.

Exemplary method 400 may include initiating a PWM pulse (e.g., in one or more switches of first three-phase switch group 210 or second three-phase switch group 220) and measuring a second voltage (operation 430, see also FIG. 8). Exemplary method 400 may include determining whether a voltage difference between the second voltage and the first voltage is greater than a threshold voltage difference (operation 435). Exemplary method 400 may include, in response to determining the voltage difference is less than the threshold voltage difference (no in operation 435), increasing the gate to source voltage and performing a fault check (operation 450, also see FIG. 9).

Exemplary method 400 may include, in response to determining the voltage difference is greater than the threshold voltage difference (yes in operation 435), determining whether the bus voltage is less than a threshold voltage (operation 440). Exemplary method 400 may include, in response to determining that the bus voltage is less than the threshold voltage (yes in operation 440), ending the active discharge operation (operation 445). Exemplary method 400 may include, in response to determining the bus voltage is greater than the threshold voltage (no in operation 440), accelerating the active discharge (operation 460, also see FIG. 10). Exemplary method 400 may repeat operation 440 and operation 460 until the bus voltage is determined to be less than the threshold voltage (yes in operation 440), thus ending the active discharge operation (operation 445).

FIG. 5 depicts an exemplary method for initializing inverter 110, according to one or more embodiments. Operation 405 (also see FIG. 4) may include initializing inverter 110 (operation 510), such as in an initial start-up of inverter 110 from a key-off to key-on event. Operation 405 may include verifying that inverter 110 has no faults (operation 520). Operation 405 may include determining a device threshold voltage (operation 530). Operation 405 may include storing the determined threshold voltage in a lookup table (operation 540). For example, the algorithm may generate a look up table that characterizes the expected power switch package temperature and gate threshold voltage. Operation 405 may include determining the device temperature (operation 550). Operation 405 may include storing the determined device temperature in a lookup table (operation 560). For example, the algorithm may update the lookup table as device threshold voltage and temperatures change over time. Operation 405 may continue to operation 410 (see FIG. 4).

Figure 6:
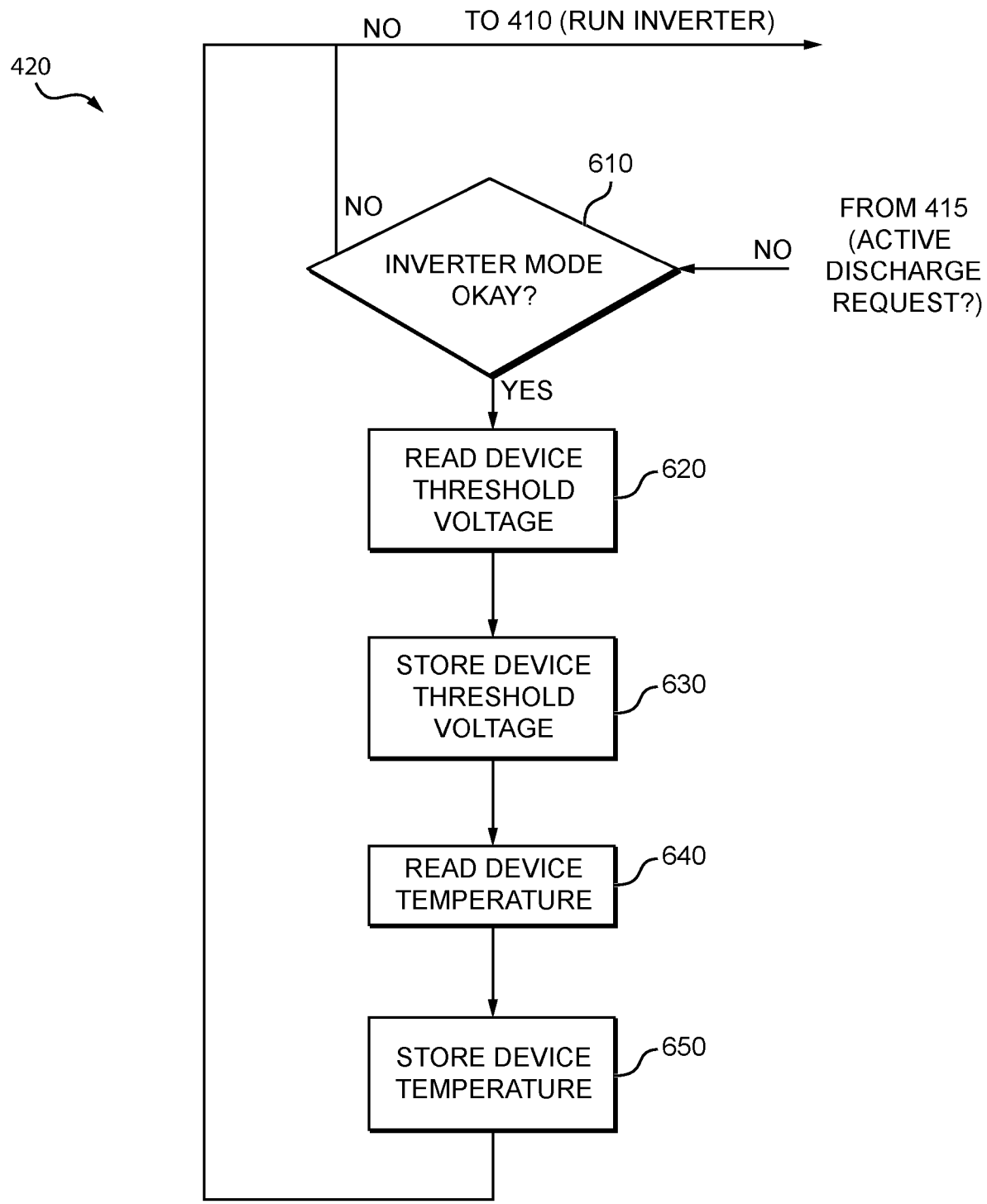
FIG. 6 depicts an exemplary method for storing device threshold voltage and temperature, according to one or more embodiments.

FIG. 6 depicts an exemplary method for storing device threshold voltage and temperature, according to one or more embodiments. Operation 420 (also see FIG. 4) may continue from operation 415 (also see FIG. 4). For example, the algorithm may generate a look up table that characterizes the expected power switch package temperature and gate threshold voltage of the power switch. The algorithm may update the look up table whenever the inverter is placed in a six switch open operation with no current flowing due to back EMF in the system. Operation 420 may include determining whether the inverter mode is in a status that allows reading a device threshold voltage (e.g., all six switches are open) (operation 610). Operation 420 may include, in response to determining the inverter mode is not in a status that allows reading a device threshold voltage (no in operation 610), returning to operation 410. Operation 420 may include, in response to determining the inverter mode is in a status that allows reading a device threshold voltage (yes in operation 610), reading a device threshold voltage (operation 620). Operation 420 may include storing the device threshold voltage (operation 630). Operation 420 may include reading device temperature (operation 640). Operation 420 may include storing device temperature (operation 650). For example, operation 420 may include updating and storing the device threshold voltage and temperature in the lookup table (see operation 560). Operation 420 may return to operation 410 (see FIG. 4).

Figure 7:
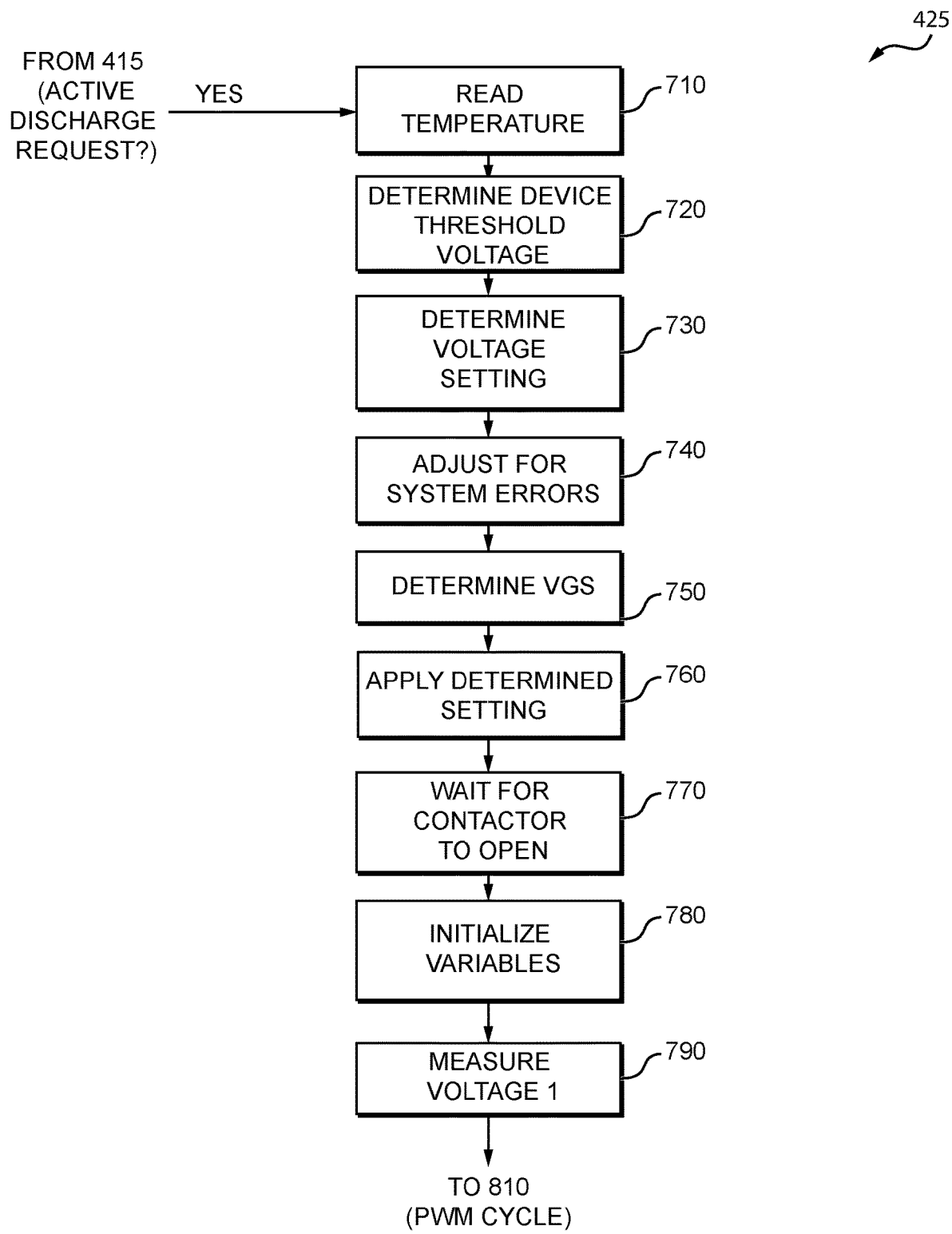
FIG. 7 depicts an exemplary method for initializing active discharge, according to one or more embodiments.

FIG. 7 depicts an exemplary method for initializing active discharge, according to one or more embodiments. Operation 425 (also see FIG. 4) may continue from operation 415 (see FIG. 4). 1V, for example, of system error may be caused by one or more of measurement error of threshold detection in the gate driver, low current threshold detection versus conduction current, or threshold variation as a function of temperature. The initial temperature used should correlate to the coolant temperature, as the thermal time constant will allow for the starting temperature relative to coolant temperature. Based on the calculated ideal threshold voltage and the subtracted error, the algorithm may determine the nearest gate voltage setting provided by the gate driver, and round down to a nearest value in the look up table.

Operation 425 may include reading the inverter 110 temperature (operation 710). Operation 425 may include determining device threshold voltage (operation 720). Operation 425 may include determining a voltage setting (operation 730). Operation 425 may include adjusting for system errors (operation 740). Operation 425 may include determining a gate to source voltage (operation 750). Operation 425 may include applying the determined voltage setting (operation 760). For example, the algorithm may determine the nearest gate voltage setting provided by the gate driver, and round down to a nearest value in the look up table. Operation 425 may include waiting for the contactor to open (operation 770). For example, the wait time may be approximately 2.5 seconds. Operation 425 may include initializing variables (operation 780). For example, the variables may include setting the count and clamped cycle to a value of 0. Operation 425 may include measuring a first voltage (operation 790), such as a voltage of high voltage DC bus or capacitor 230, for example. Operation 425 may continue to operation 430 (also see FIG. 4).

FIG. 8 depicts an exemplary method for initiating a pulse and measure function, according to one or more embodiments. Operation 430 may continue from operation 425 (also see FIG. 4). Operation 430 may receive information from operation 790 (see FIG. 7) and operations 920 and 940 (see FIG. 9). For example, operation 430 may receive the measured first voltage from operation 790, the increased gate to source voltage, and a determination that the clamped cycle equals 2. Operation 430 (see FIG. 4) may include performing a PWM cycle (operation 810). For example, operation 810 may including controlling inverter 110 for a pulse for 6.4 µs on and 600 µs off for 3 ms (e.g., 5 cycles). Operation 430 may include performing a wait time (operation 820). For example, the wait time may include a time of approximately 174 ms. Operation 430 may include measuring a second voltage (operation 830), such as a voltage of high voltage DC bus or capacitor 230, for example. Operation 430 may continue to operation 435 (also see FIG. 4).

Figure 9:
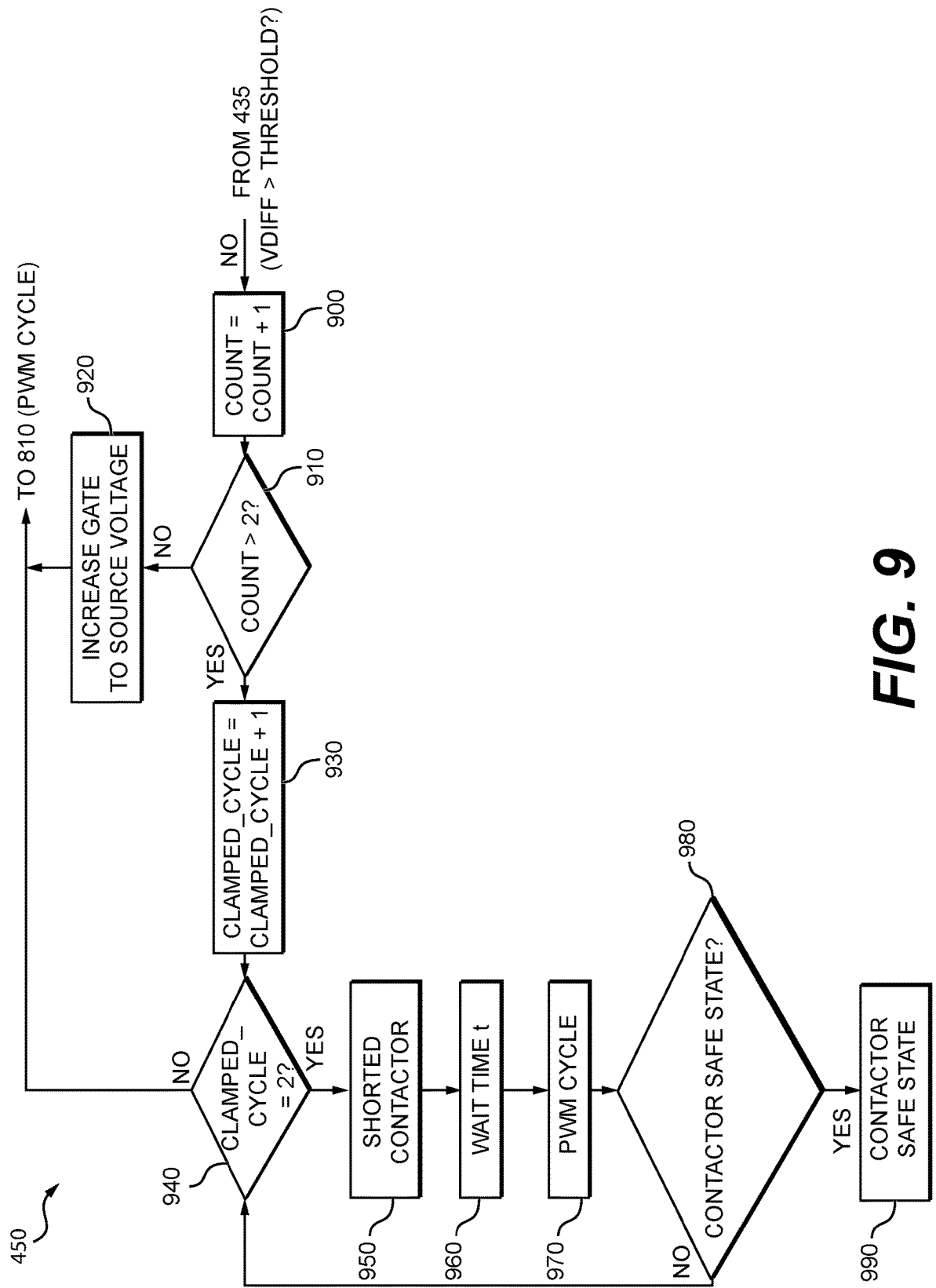
FIG. 9 depicts an exemplary method for increasing the gate to source voltage and fault check, according to one or more embodiments.

FIG. 9 depicts an exemplary method for increasing the gate to source voltage and fault check, according to one or more embodiments. Operation 450 may continue from operation 435 (see FIG. 4). For example, operation 450 may continue from operation 435 when the voltage difference is less than the threshold voltage. Operation 450 may include incrementing a count by 1 (operation 900). Operation 450 may include determining whether the count is greater than 2 (operation 910). Operation 450 may include, in response to determining the count is not greater than 2 (no in operation 910) (e.g., a total of 3 iterations based on an initial count of 0), increasing the gate to source voltage (operation 920) and returning to operation 810. Operation 450 may include, in response to determining the count is greater than 2 (yes in operation 910), incrementing a clamped cycle count by 1 (operation 930). Operation 450 may include determining whether the clamped cycle count is equal to 2 (operation 940). Operation 450 may include, in response to determining the clamped cycle count is not equal to 2 (no in operation 940) (e.g., a total of 3 iterations based on an initial count of 0), returning to operation 810.

Operation 450 may include, in response to determining the clamped cycle count is equal to 2 (yes in operation 940), determining that the contactor has faulted (e.g., shorted) (operation 950). Operation 450 may include waiting a time t (operation 960). For example, the wait time may be approximately 174 ms. Operation 450 may include performing a PWM cycle (operation 970). For example, operation 970 may include controlling an operation of inverter 110 to pulse for 6.4 µs on and 600 µs off for 3 ms (e.g., 5 cycles). Operation 450 may include determining whether a safe state for the contactor has been commanded (operation 980). Operation 450 may include, in response to determining the safe state for the contactor has been commanded (yes in operation 980), performing a contactor safe state operation and ending the active discharge operation of inverter 110 (operation 990). Operation 450 may include, in response to determining the safe state for the contactor has not been commanded (no in operation 980), returning to operation 940.

Figure 10:
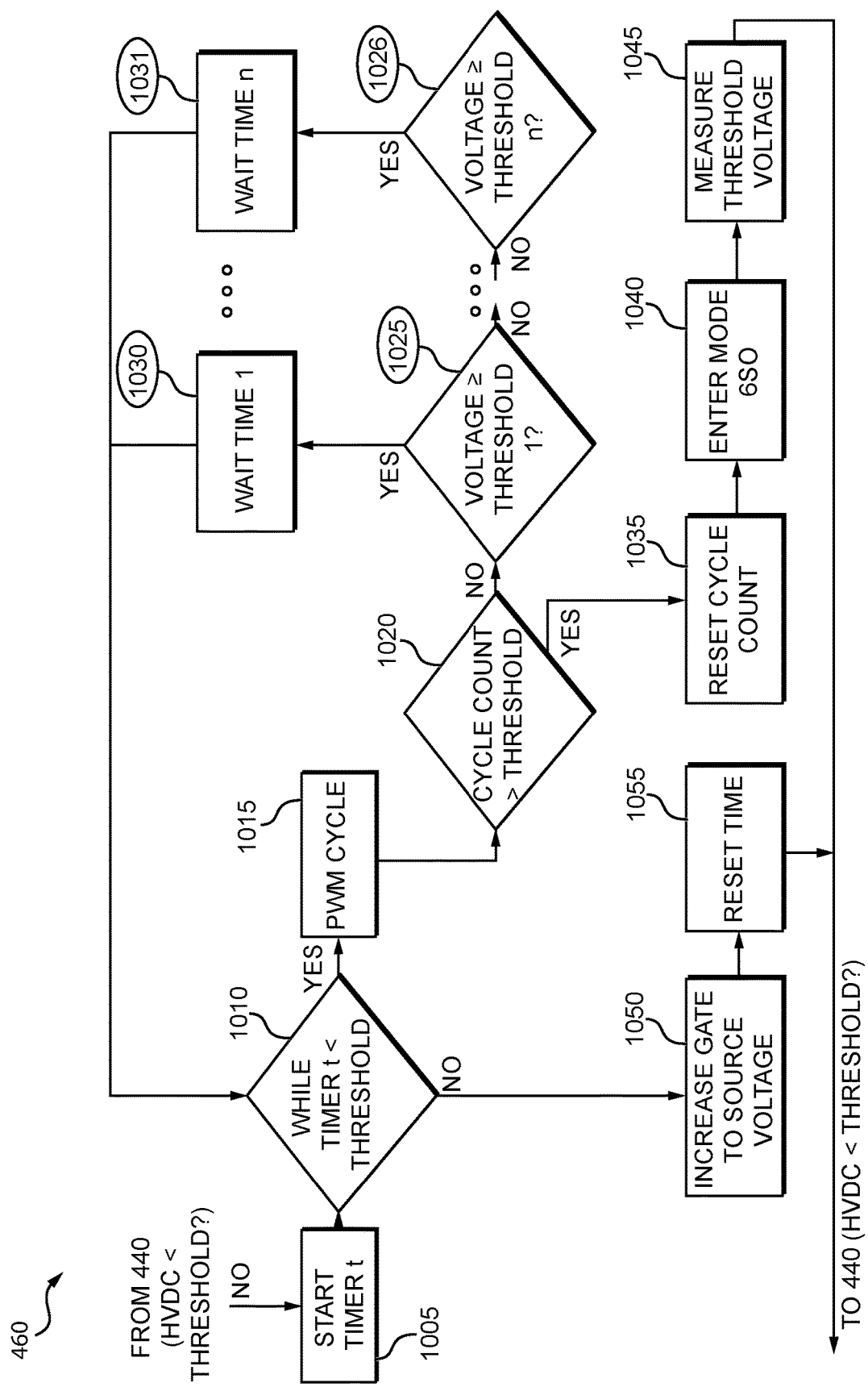
FIG. 10 depicts an exemplary method for accelerating active discharge, according to one or more embodiments.

FIG. 10 depicts an exemplary method for accelerating active discharge, according to one or more embodiments. Operation 460 may continue from operation 440 (also see FIG. 4). Operation 460 may include initiating a timer (operation 1005). Operation 460 may include determining whether the timer is less than a threshold (operation 1010). For example, the threshold may be approximately 150 ms. Operation 460 may include, in response to determining the timer is less than the threshold (yes in operation 1010), initiating a PWM cycle (operation 1015). For example, operation 1015 may include controlling an operation of inverter 110 to pulse for 6.4 µs on and 600 µs off for 3 ms (e.g., 5 cycles).

Operation 460 may include determining whether the PWM cycle count is greater than a threshold (operation 1020). For example, the PWM cycle count limit may be 67 cycles. Operation 460 may include, in response to determining that the PWM cycle count is not greater than a threshold (no in operation 1020) determining whether a voltage is greater than or equal to a first threshold (operation 1025). Determining whether a voltage is greater than or equal to a threshold may also be performed by determining whether a voltage is within a threshold range.

Operation 460 may include, in response to determining the voltage is greater than or equal to a first threshold (yes in operation 1025), waiting (i.e., delaying an operation of switches of first three-phase switch group 210 and second three-phase switch group 220) a first time (operation 1030), and returning to operation 1010. Operation 460 may include, in response to determining the voltage is not greater than or equal to a first threshold (no in operation 1025), determining whether a voltage is greater than or equal to a second threshold (operation 1026). Operation 460 may include, in response to determining that the voltage is greater than or equal to a second threshold (yes in operation 1026), waiting a second time (operation 1031), and returning to operation 1010.

The first threshold may be greater than the second threshold, and the first time may be longer than a second time. Accordingly, as a voltage (e.g., of capacitor 230) decreases, a wait time between pulses of operation 1015 may also decrease, thereby accelerating a discharge of the voltage. Operation 1025 and operation 1026 are depicted as two operations, but operation 460 may include any number (n) of threshold operations and any number (n) of corresponding wait times to adjust an acceleration of the active discharge in any number (n) of increments. The second threshold (i.e., nth threshold) may equal the threshold of operation 440 so that a final threshold decrease with wait time n occurs when a voltage approaches a safety voltage threshold (e.g., 60V).

Operation 460 may include, in response to determining that the PWM cycle count is greater than a threshold (no in operation 1020), resetting the cycle count (operation 1035). Operation 460 may include opening one or more switches of inverter 110 (operation 1040). Operation 460 may include measuring a threshold voltage (operation 1045), and returning to operation 440. Operation 460 may include, in response to determining the timer is not less than the threshold (no in operation 1010), increasing the gate to source voltage (operation 1050). Operation 460 may include resetting the timer (operation 1055). Operation 460 may continue to operation 440 (see FIG. 4).

Figure 11:
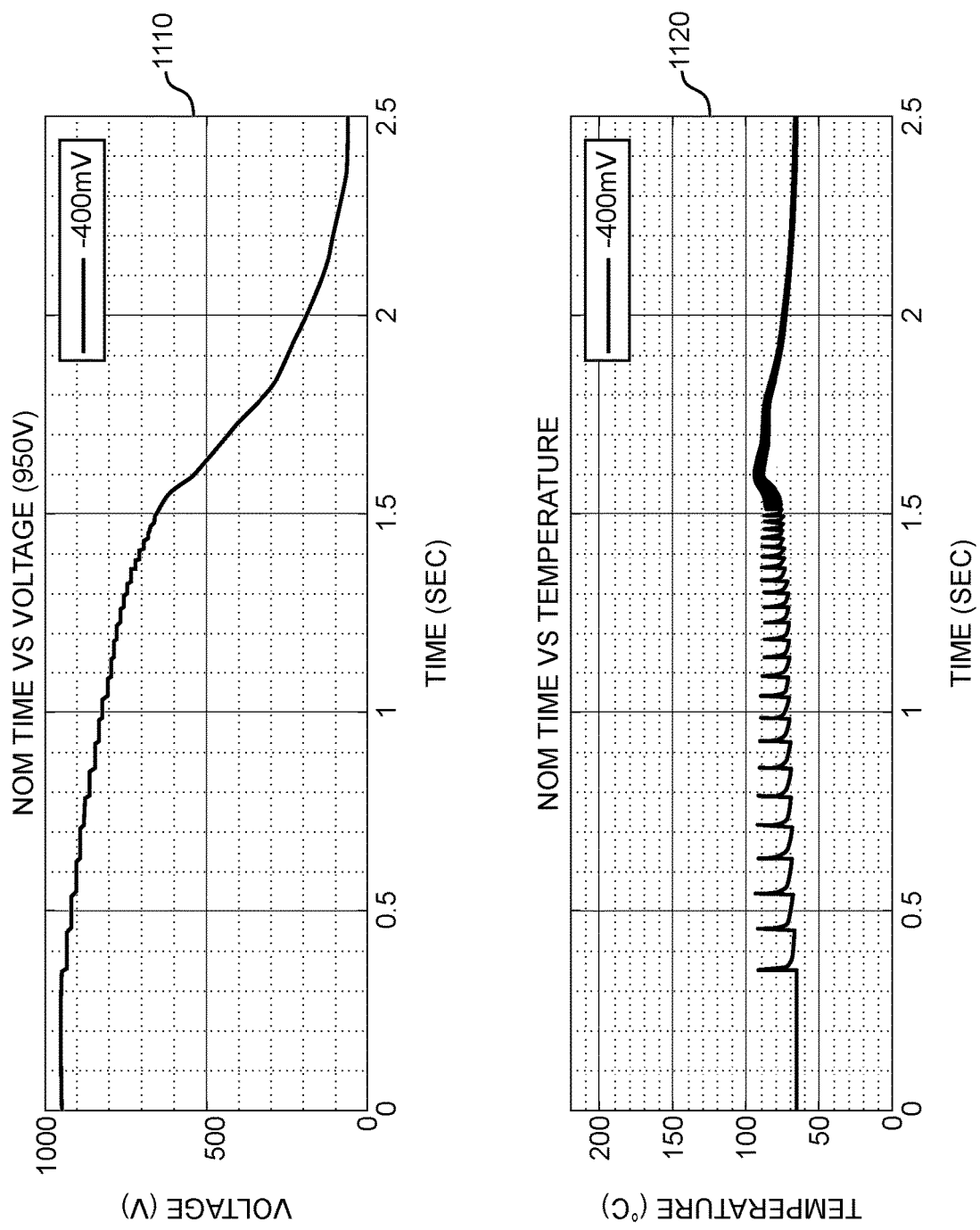
FIG. 11 depicts exemplary plots of voltage and temperature of an inverter during an active discharge, according to one or more embodiments.

FIG. 11 depicts exemplary plots of voltage and temperature of an inverter during an active discharge, according to one or more embodiments. Plot 1110 depicts the voltage decreasing as a function of time with an accelerated voltage discharge. Plot 1120 depicts temperature of inverter 110 as a function of time including temperature spikes during discharge of the voltage. As depicted in FIG. 11, as the voltage decreases over time, the wait time between temperature spikes decreases, allowing for more frequent pulses and thereby accelerating the decrease in voltage.

One or more embodiments may overcome the issues of some methodologies of active discharge as described above. For example, one or more embodiments may address one or more of: insufficient resolution on the Vgs setting to control shoot through current to safe levels; insufficient pulse width control; insufficient discharge period control; insufficient resolution of the Vgs measurement; an inability to predict resultant current at high Vds voltages; an inability to detect which inverter is performing the active discharge, and which bulk capacitor is being discharged; an inability to predict the value of capacitance being discharged; or an inability to predict SiC FET transconductance, and the effects thereof.

One or more embodiments may provide an algorithm that systematically estimates power switch bias voltage, programmatically increments a gate voltage, and ensures safe operating compliance in active short circuit mode of active discharge with an optimized bulk capacitor discharge time.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   an inverter configured to convert DC power from a battery to AC power to drive a motor, wherein the inverter includes:
   one or more switches; and
   one or more controllers configured to:
      determine a gate voltage to operate the one or more switches of the inverter based on a temperature of the inverter;
      operate the one or more switches based on a pulse width modulated (PWM) signal and the gate voltage to initiate an active discharge of a bus voltage of the inverter; and
      while the bus voltage is greater than a first threshold voltage, accelerate the active discharge of the bus voltage by operating the one or more switches and by performing one or more of increasing the gate voltage or decreasing a wait time following a pulse of the PWM signal.

2. The system of claim 1, wherein the one or more controllers are further configured to:
   determine a voltage reduction of the bus voltage based on the operation of the one or more switches; and
   in response to determining the voltage reduction of the bus voltage is less than a second threshold voltage, performing one or more of increasing the gate voltage or determining whether a contactor of the inverter has faulted.

3. The system of claim 2, wherein performing one or more of increasing the gate voltage or determining whether the contactor of the inverter has faulted includes:
   incrementing a fault count;
   when the fault count is less than a fault threshold, increasing the gate voltage; and
   when the fault count is greater than or equal to the fault threshold, determining whether the contactor of the inverter has faulted.

4. The system of claim 1, wherein determining the gate voltage further includes:
   determining the temperature of the inverter;
   determining a threshold voltage for the one or more switches; and
   determining the gate voltage based on the threshold voltage for the one or more switches, wherein the gate voltage is less than the threshold voltage for the one or more switches.

5. The system of claim 1, wherein performing one or more of increasing the gate voltage or decreasing the wait time following the pulse of the PWM signal further initiating a timer;
   when the timer is greater than a threshold time, increasing the gate voltage and resetting the timer; and
   while the timer is less than the threshold time:
      operating the one or more switches based on a first PWM signal;
      determining the bus voltage; and
      setting the wait time following the first PWM signal based on the bus voltage.

6. The system of claim 5, wherein performing one or more of increasing the gate voltage or decreasing the wait time following the pulse of the PWM signal further includes:
   while the timer is less than the threshold time:
      operating the one or more switches based on the first PWM signal;
      determining whether a PWM cycle count of the first PWM signal is greater than a threshold cycle count; and
      when the PWM cycle count is greater than the threshold cycle count, resetting the PWM cycle count, opening the one or more switches, and determining the first threshold voltage.

7. The system of claim 6, wherein setting the wait time following the first PWM signal based on the bus voltage includes:
   when the bus voltage is in a first voltage range, setting the wait time to a first value, delaying the operation of the one or more switches for the first value of the wait time, and determining whether the timer is less than the threshold time, and
   when the bus voltage is in a second voltage range less than the first voltage range, setting the wait time to a second value less than the first value, delaying operation of the one or more switches for the second value of the wait time, and determining whether the timer is less than the threshold time,
   wherein a lower value of the second voltage range is equal to the first threshold voltage.

8. The system of claim 1, further comprising:
   the battery configured to supply the DC power to the inverter; and
   the motor configured to receive the AC power from the inverter to drive the motor,
   wherein the system is provided as a vehicle including the inverter, the battery, and the motor.

9. A system including one or more controllers configured to:
   determine a gate voltage to operate one or more switches of an inverter based on a temperature of the inverter;

operate the one or more switches based on a pulse width modulated (PWM) signal and the gate voltage to initiate an active discharge of a bus voltage of the inverter; and while the bus voltage is greater than a first threshold voltage, accelerate the active discharge of the bus voltage by operating the one or more switches and by performing one or more of increasing the gate voltage or decreasing a wait time following a pulse of the PWM signal.

10. The system of claim 9, wherein performing one or more of increasing the gate voltage or decreasing the wait time following the pulse of the PWM signal further includes:

initiating a timer;

when the timer is greater than a threshold time, increasing the gate voltage and resetting the timer; and while the timer is less than the threshold time:
operating the one or more switches based on a first PWM signal;
determining the bus voltage; and
setting the wait time following the first PWM signal based on the bus voltage.

11. The system of claim 10, wherein setting the wait time following the first PWM signal based on the bus voltage includes:

when the bus voltage is in a first voltage range, setting the wait time to a first value, delaying the operation of the one or more switches for the first value of the wait time, and determining whether the timer is less than the threshold time, and when the bus voltage is in a second voltage range less than the first voltage range, setting the wait time to a second value less than the first value, delaying operation of the one or more switches for the second value of the wait time, and determining whether the timer is less than the threshold time.

12. A method comprising:

performing, by one or more controllers, operations for controlling an inverter, the operations including:
receiving a request to initialize an active discharge of a bus voltage of the inverter;
determining a gate voltage to operate one or more switches of the inverter based on a temperature of the inverter;
operating the one or more switches based on a pulse width modulated (PWM) signal and the gate voltage to initiate the active discharge of the bus voltage; and
while the bus voltage is greater than a first threshold voltage, accelerating the active discharge of the bus voltage by operating the one or more switches and by performing one or more of increasing the gate voltage or decreasing a wait time following a pulse of the PWM signal.

13. The method of claim 12, the operations further including:

operating the one or more switches;
determining a voltage reduction of the bus voltage; and
in response to determining the voltage reduction of the bus voltage is less than a second threshold voltage, performing one or more of increasing the gate voltage or determining whether a contactor of the inverter has faulted.

14. The method of claim 13, wherein performing one or more of increasing the gate voltage or determining whether the contactor of the inverter has faulted includes:

incrementing a fault count;
when the fault count is less than a fault threshold, increasing the gate voltage; and
when the fault count is greater than or equal to the fault threshold, determining whether the contactor of the inverter has faulted.

15. The method of claim 12, wherein determining the gate voltage further includes:

determining the temperature of the inverter;
determining a threshold voltage for the one or more switches; and
determining the gate voltage based on the threshold voltage for the one or more switches, wherein the gate voltage is less than the threshold voltage for the one or more switches.

16. The method of claim 12, wherein performing one or more of increasing the gate voltage or decreasing the wait time following the pulse of the PWM signal further initiating a timer; and when the timer is greater than a threshold time, increasing the gate voltage and resetting the timer.

17. The method of claim 16, wherein performing one or more of increasing the gate voltage or decreasing the wait time following the pulse of the PWM signal further includes:

while the timer is less than the threshold time:
operating the one or more switches based on a first PWM signal;
determining the bus voltage; and
setting the wait time following the first PWM signal based on the bus voltage.

18. The method of claim 17, wherein performing one or more of increasing the gate voltage or decreasing the wait time following the pulse of the PWM signal further includes:

while the timer is less than the threshold time:
operating the one or more switches based on the first PWM signal;
determining whether a PWM cycle count of the first PWM signal is greater than a threshold cycle count; and
when the PWM cycle count is greater than the threshold cycle count, resetting the PWM cycle count, opening the one or more switches, and determining the first threshold voltage.

19. The method of claim 17, wherein setting the wait time following the first PWM signal based on the bus voltage includes:

when the bus voltage is in a first voltage range, setting the wait time to a first value, delaying the operation of the one or more switches for the first value of the wait time, and determining whether the timer is less than the threshold time, and when the bus voltage is in a second voltage range less than the first voltage range, setting the wait time to a second value less than the first value, delaying operation of the one or more switches for the second value of the wait time, and determining whether the timer is less than the threshold time.

20. The method of claim 19, wherein a lower value of the second voltage range is equal to the first threshold voltage.

* * * * *